United States Patent [19]

Netto

[11] Patent Number: 5,318,418
[45] Date of Patent: Jun. 7, 1994

[54] PLASTIC INJECTION MOLD WITH SERIAL NUMBERING

[76] Inventor: Eduardo D. L. C. Netto, Rua Othon Bezerra de Melo, 40, Rio de Janeiro, Brazil

[21] Appl. No.: 917,134

[22] PCT Filed: Jan. 23, 1991

[86] PCT No.: PCT/BR91/00001

§ 371 Date: Aug. 10, 1992

§ 102(e) Date: Aug. 10, 1992

[87] PCT Pub. No.: WO89/02831

PCT Pub. Date: Apr. 6, 1989

[30] Foreign Application Priority Data

Feb. 9, 1990 [BR] Brazil ................................. 9000587

[51] Int. Cl.⁵ ........................................... B29C 45/37
[52] U.S. Cl. ................................. 425/150; 249/103; 425/169; 425/183; 425/185; 425/190; 425/588
[58] Field of Search ............... 425/150, 588, 169, 186, 425/190, 183, 185; 249/102, 103

[56] References Cited

U.S. PATENT DOCUMENTS

| | | | |
|---|---|---|---|
| 4,106,801 | 8/1978 | De Lima Castro Netto | 292/307 R |
| 4,254,933 | 3/1981 | Netto | 249/103 |
| 4,379,687 | 4/1983 | Wilson et al. | 249/103 |
| 5,057,000 | 10/1991 | Mangone, Jr. | 249/103 |

FOREIGN PATENT DOCUMENTS

| | | |
|---|---|---|
| WO89/02831 | 4/1989 | PCT Int'l Appl. . |
| 1149630 | 7/1966 | United Kingdom . |
| 2066137 | 7/1981 | United Kingdom . |

*Primary Examiner*—Khanh Nguyen
*Attorney, Agent, or Firm*—Beveridge, DeGrandi, Weilacher & Young

[57] ABSTRACT

A plastic injection mould capable of producing, at each injection, twenty articles numbered in serie and in high relief. The mould has a fixed plate (2) across which pass two pluralities or groups of tapes (13-18) numbered in mirror image, each plurality passing two series of numbers fixed on the plate. The fixed numbers corresponding to one of the pluralities of tapes are 0, 2, 4, 6, 8, 0, 2, 4, 6, 8 while the numbers corresponding to the other plurality are 1, 3, 5, 7, 9, 1, 3, 5, 7, 9. The tape (18) of each plurality that passes adjacent the fixed numbers contains an even number of series of ten groups of five identical algorisms (0, 0, 0, 0, 0; 1, 1, 1, 1, 1; 9, 9, 9, 9) whereas each of the other tapes contains at least one series of ten groups of ten identical algorisms (0, 0, 0, 0, 0, 0, 0, 0, 0, 0; . . . 9, 9, 9, 9, 9, 9, 9, 9, 9, 9). Tape advancing mechanisms advance the first mentioned tapes (18) after each injection by ten increments corresponding to two of the said groups of five, the second tapes (17) being advanced by the same distance after each five advances of the first tapes and the other tapes (15, 14, 13) being advanced by the same distance after each ten advances of the immediately previous tape.

7 Claims, 3 Drawing Sheets

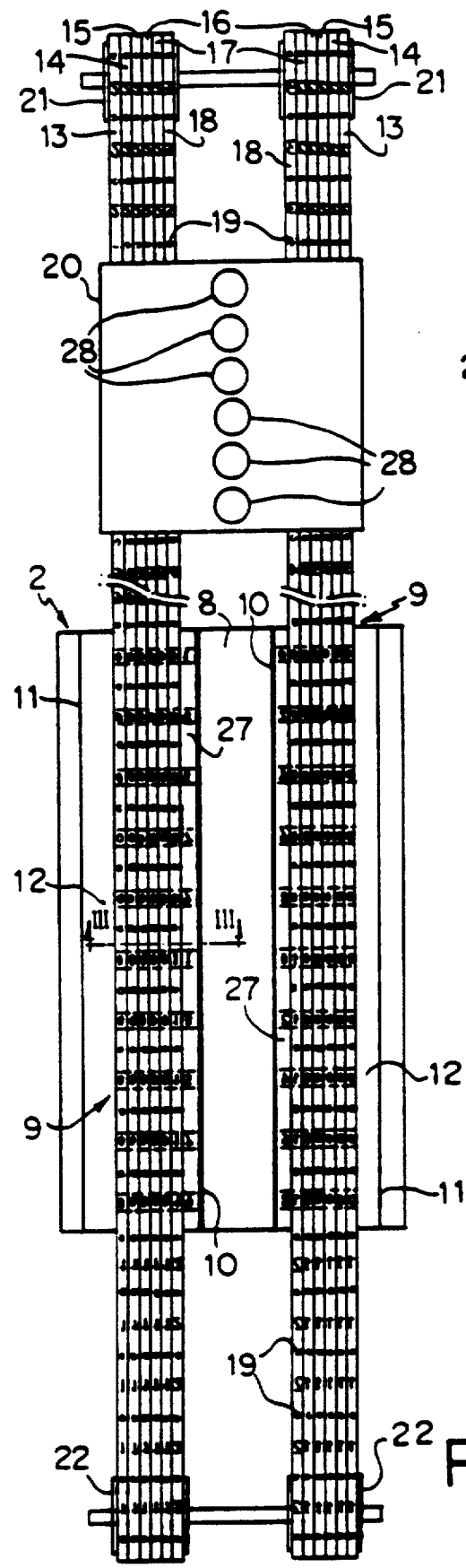
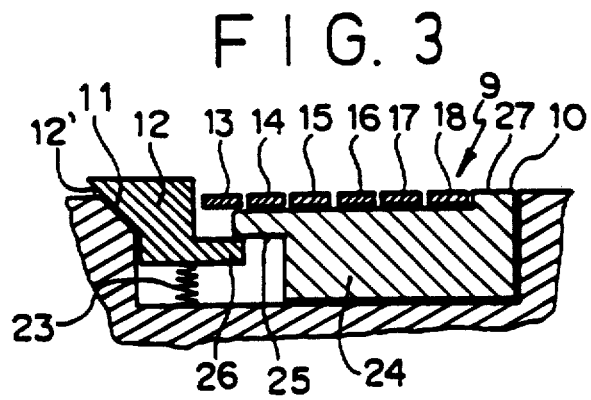
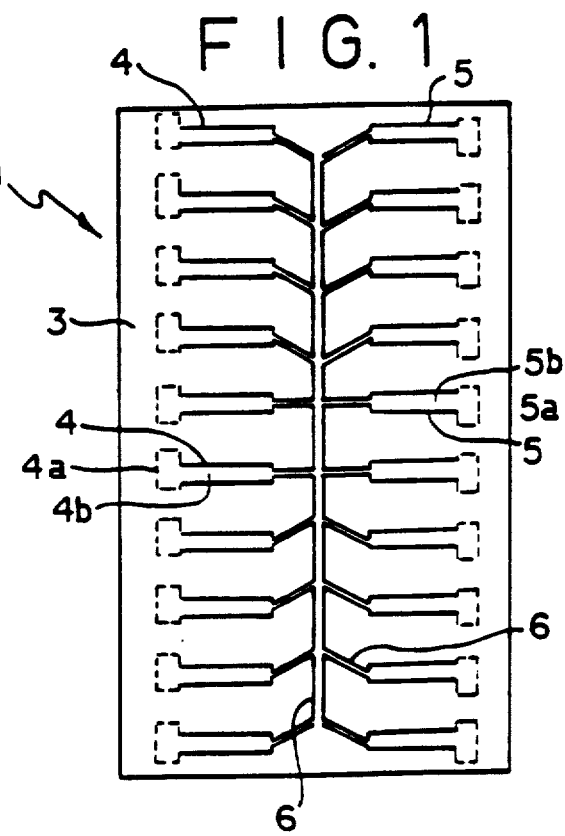

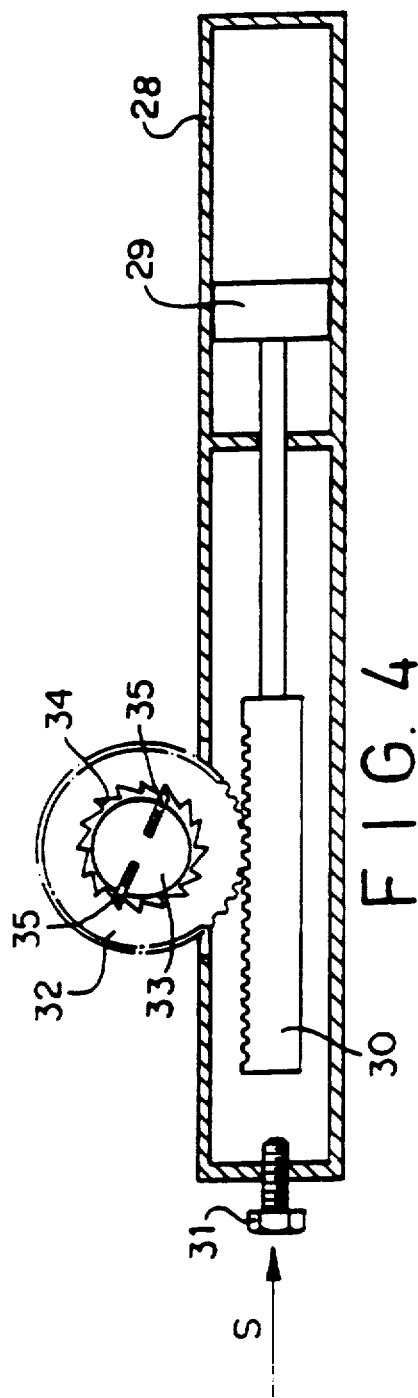
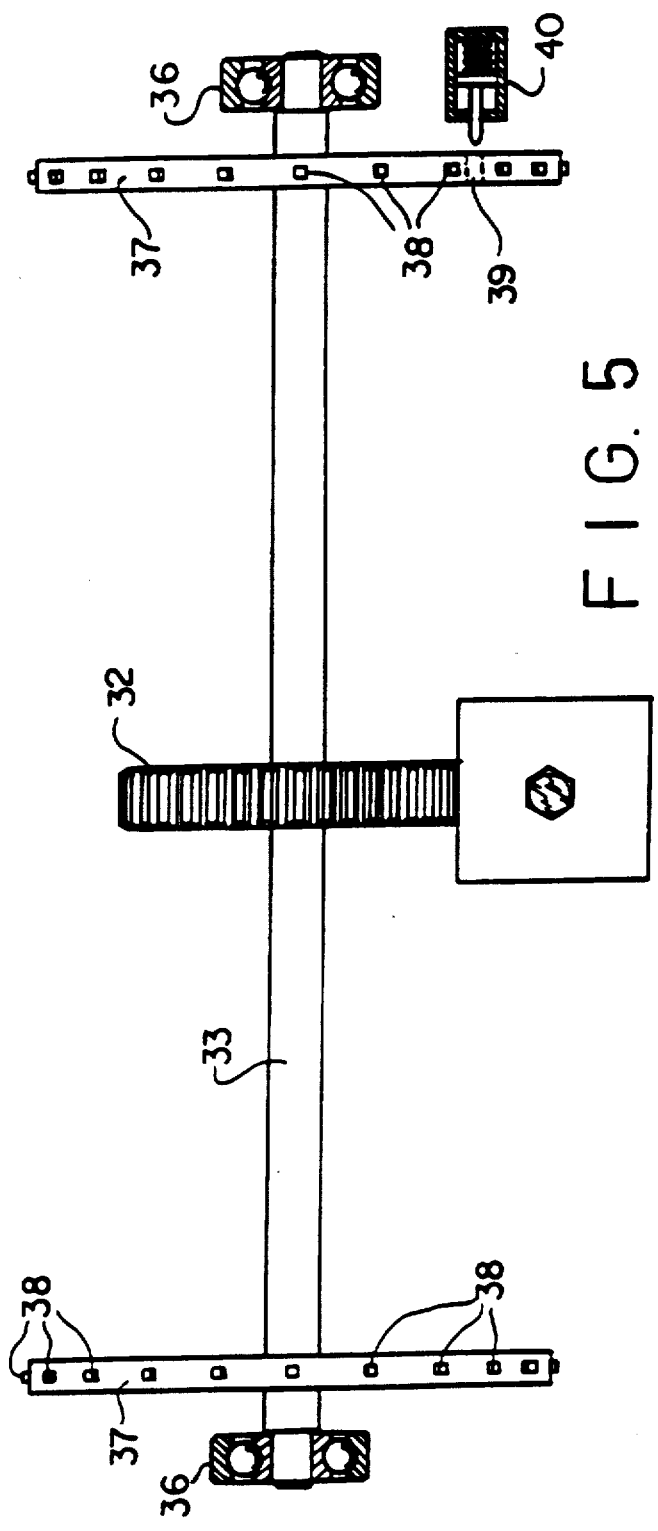

PLASTIC INJECTION MOLD WITH SERIAL NUMBERING

The present invention refers to the injection molding of plastic articles, such as security seals, which are automatically numbered in a multi-cavity mold.

BACKGROUND OF THE INVENTION

Various types of injection molds capable of numbering products being molded in high relief are known, one example being disclosed in GB-A-2 066 137 which relates to a mold for injection molding a plurality of plastic articles simultaneously with the articles being automatically numbered without repeating the combinations of algorithms, but without taking into consideration sequential numbering. The mold comprises two circular mold halves defining therebetween ten radially arranged cavities for producing the numbering, the individual numbers being embossed on a series of radially adjacent split rings of increasing diameter that are rotatable with respect to each other so that different combinations of numbers are produced along ten radii corresponding to the cavities. A frustoconical hub inside the innermost ring is forced outwardly of the respective mold half between injection cycles so as to loosen the split rings and thus allow relative rotation thereof by means of a counter mechanism. On closure of the mold halves, the frustoconical hub is forced into the plane of the respective mold half, this expanding the split rings to squeeze them against each other and thus avoid any gaps that would give rise to undesirable injection trimmings between the algorithms of the injection molded numbers.

As mentioned, the mold of GB-A-2 066 137 is designed to mold groups of ten numbers in each injection, counter mechanism being such as to ensure that sequential bering is avoided without any repetition of numbering being produced before all available number combinations have been used.

The prior art does not, however, include any numbering injection mold that is capable of injecting lots of twenty (rather than ten) products with serial numbering, the alteration of the numbering between each lot being automatic. The object of the present invention is therefore to provide an injection mold having such characteristics.

SUMMARY OF THE INVENTION

According to the present invention, a plastic injection mold with serial numbering of the objects being molded comprises:

a) a first plate having two substantially parallel series of ten cavities;

b) a second plate adapted to be brought against the first plate to close said cavities, the second plate being provided with two series of ten fixed algorithms in positions corresponding to the last algorisms of the numbers to be molded in the respective cavities of the first plate, the fixed algorithms of the first series being respectively the even numbers 0, 2, 4, 6, 8, 0, 2, 4, 6 and 8 and the fixed algorithms of the second series being respectively the odd numbers 1, 3, 5, 7, 9, 1, 3, 5, 7 and 9;

c) two pluralities of endless molding tapes, a first tape of each plurality having spaced therealong an even number of series of ten groups of five identical algorithms 0, 0, 0, 0, 0; 1, 1, 1, 1, 1; ... 9, 9, 9, 9, 9, and each of the other tapes having spaced therealong at least one series of ten groups of ten identical algorithms 0, 0, 0, 0, 0, 0, 0, 0, 0, 0; 1, 1, 1, 1, 1, 1, 1, 1, 1, 1; ... 9, 9, 9, 9, 9, 9, 9, 9, 9, 9, each algorithm of each of the tapes being spaced from the next and from the previous algorithms by a distance equal to the distance between said fixed algorithms, and the number of series of groups of algorithms on said other tapes being half the even number of series on said first tapes;

d) two parallel recessed passages in the face of the second plate for the passage of the respective pluralities of tapes so that twenty numbers in series may be composed together with the twenty fixed numbers;

e) means for individually advancing said tapes along said passages by increments corresponding to ten times or a multiple of ten times the said distance between the fixed numbers; and f) command means for activating the advancing means in accordance with a predetermined programme.

Preferably, the width of each passage in the second plate is greater than the sum of the widths of the tapes in each plurality of tapes so as to permit the longitudinal advance of only one or more of the tapes when said plates are separated from each other, the second plate being further provided with means laterally squeezing the tapes of each plurality together when said plates are brought against each other. In the preferred embodiment of the present invention, such means comprise, in each passage, a bevelled side edge and a wedge type bar having a correspondingly bevelled edge for cooperation with the bevelled edge of the passage, the bar being mounted within the passage and biased outwardly when the second plate is not against the first plate.

BRIEF DESCRIPTION OF THE DRAWINGS

The invention will be better understood from the following description of an embodiment thereof given only by way of example, with reference to the accompanying drawings, in which:

FIG. 1 is a front view of the movable plate of a plastic injection mold constructed in accordance with the present invention;

FIG. 2 is a front view of the fixed plate of the mold, also showing the numbering tapes and the tape advancing system;

FIG. 3 is a partial section of the fixed plate, taken along line III—III of FIG. 2 and showing a detail related to the passage of the numbering tapes along the plate;

FIG. 4 is a lateral schematic view of a hydraulic piston and rack and pinion system used in the tape advancing mechanism;

FIG. 5 is a side view, which is also schematic, of the tape advancing system, looking in the direction of arrow S in FIG. 4.

DESCRIPTION OF THE PREFERRED EMBODIMENT

Figure 6:
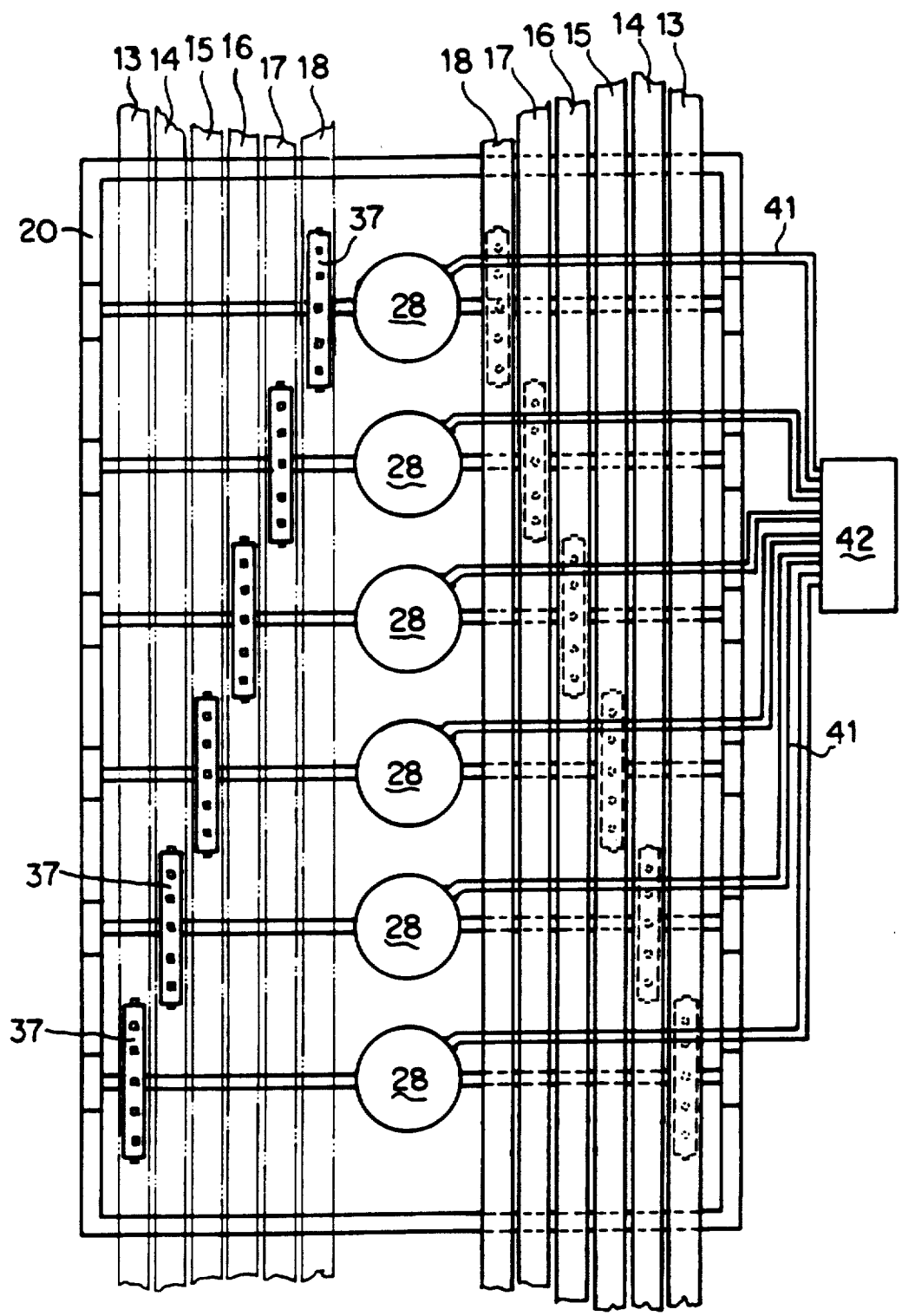
FIG. 6 is a schematic front view of the six tape advancing systems used as part of the mold.

Referring now to the drawings, FIGS. 1 and 2 show schematically the cooperating faces of the two plates 1 and 2 of an injection mold constructed in accordance with the present invention. The first plate 1 is movable and is to be mounted on the movable part of a plastic injection machine (not shown). The face 3 of plate 1 is formed with twenty cavities 4 and 5 for the injection molding of the products to be manufactured. Each cavity 4 or 5 comprises a main part 4a or 5a, in this case of an undefined shape and indicated by dotted lines since the product itself—for example, a security seal—is not relevant to the present invention. Each cavity 4 or 5 further comprises a part 4b or 5b defining a blade or tag to be numbered with numbers to be molded in relief. Cavities 4 and 5 are arranged on face 3 of plate 1 in two parallel series of ten cavities each. Each cavity 5 is inverted and in mirror image with respect to the cavities 4.

Face 3 of plate 1 is also formed with the channels 6 that are necessary for feeding plastic to the cavities during injection which is effected through injection channels (not shown).

The face 8 of the second or fixed plate 2 is formed with two parallel passages 9 recessed therein in such a way that, when faces 3 and 8 are brought together to close cavities 4 and 5, such passages cross at right angles the blade forming portions 4b and 5b of the cavities. In order to facilitate understanding, the positions of portions 4b and 5b in the closed configuration of the mold are indicated by dotted lines in FIG. 2.

Adjacent one edge of each passage 9, such edge corresponding to the free ends of the blade forming portions 4b and 5b of the cavities 4 and 5, fixed algorithms are engraved in low relief in a manner to be described later in greater detail with reference to FIG. 3. The other edge of each passage 9 is inwardly bevelled. Each bevelled edge 11 cooperates with a correspondingly bevelled edge 12' of a wedge type bar 12 arranged in the respective passage 9, the remaining part of the passage being occupied by six continuous metal tapes 13-18 that are individually shiftable along the passage and engraved in low relief with algorithms—also in mirror image—spaced from each other by a distance equal to the distance between the cavity portions 4b and 5b, with each fixed algorithm being the last algorithm of the number to be associated therewith.

The tapes 18 of the two groups are engraved in low relief with two consecutive series of the algorithms 0, 0, 0, 0, 0; 1, 1, 1, 1, 1; 2, 2, 2, 2, 2; . . . 9, 9, 9, 9, 9 in mirror image and spaced from each other by distances precisely equal to the distances between the fixed algorithms engraved on each protuberance 27 to be mentioned later with respect to FIG. 3. Tapes 13 to 17 of the two groups are engraved in low relief with a series of the algorithms 0, 0, 0, 0, 0, 0, 0, 0, 0, 0; 1, 1, 1, 1, 1, 1, 1, 1, 1, 1; 2, 2, 2, 2, 2, 2, 2, 2, 2, 2; . . . 9, 9, 9, 9, 9, 9, 9, 9, 9, 9, which are also in mirror image and spaced from each other by distances precisely equal to those separating the fixed algorithms. The algorithms on the tapes of the second group are also inverted.

It will be noticed that each of tapes 13 to 18 is formed with equally spaced orifices to cooperate with an advancing system contained for the most part in a housing 20, more details of which will be given later with reference to FIGS. 4, 5 and 6. Tapes 13 to 18 then pass around two pulleys 21 and 22 situated respectively above housing 20 and at a level below that of the fixed plate 2. Thus, each tape may be advanced in increments and as desired by means of the advancing system.

FIG. 3 is a partial cross section of plate 2 of the mold, taken along line III—III of FIG. 2 and showing one of the passages 9 (that on the left in FIG. 2) with its bevelled edge 10, the wedge bar 12 biased outwardly by a spring 23, and also a fixed insert 24 serving as a support base for the tapes and undercut at a longitudinal lower edge at 25 to cooperate with a tooth 26 formed on bar 12, preventing the latter from escaping under the action of the spring 23 when the plates 1 and 2 are separated. The upper edge of the insert 24, opposite to that associated with bar 12, is formed with a protuberance 27 therealong that has a width and a height identical to the widths and thicknesses of the tapes 13 to 18. The upper face of protuberance 27 is engraved with the already mentioned fixed numbers or algorithms, 0, 2, 4, 6, 8, 0, 2, 4, 6 and 8 in mirror image, as shown in FIG. 2. The corresponding protuberance on the insert mounted in the other passage 9 is engraved similarly with the algorithms 1, 3, 5, 7, 9, 1, 3, 5, 7 and 9 except that they are the other way up, as also shown in FIG. 2.

It will be observed that the configuration shown in FIG. 3 corresponds to the situation when the mold is open, that is to say, with the plates 1 and 2 separated from each other. Thus, spring 23 maintains bar 12 away from passage 9 and the bevelled edges 10 and 12' of the passage and of the bar, respectively, leave the tapes 13 to 18 loose with respect to each other, shifting the bar 12 slightly to the left in FIG. 3. The tapes are thus free to be advanced individually by the advancing mechanism associated with housing 20. When the mold is closed, however, face 3 of movable plate 1 forces bar 12 inwardly and the bevelled edge 12' is obliged to follow the bevelled edge 10 of the passage 9 until its outer face assumes the same plane as face 3. This shifts the bar 12 slightly to the right in FIG. 3 and squeezes the tapes 13 to 18 against each other and against the protuberance 27, eliminating any gaps and permitting a perfect molding without the formation of burrs between the tapes.

With the arrangement of the tapes and algorithms shown in the drawings and described herein, the first injection using the mold of the invention will produce twenty objects numbered in serie with the numbers 0000000–0000019. When the plates 1 and 2 are opened after the first injection, the advancing mechanism in housing 20 will advance tapes 18 by 10 increments, that is to say, so that the numbering of the next injection will then be 0000020–0000039. This is repeated up to the fifth injection which will produce a numbering 0000080–0000099. Between the fifth and sixth injections, the advancing mechanism will advance not only the tapes 18 but also tapes 17 by ten increments so as to present the injection cavities with the numbers 0000100–0000119. After five more injections between which only tapes 18 will be advanced, tapes 17 and 18 will be advanced together once more so as to pass the numbering to 0000200–0000219. This will continue until the eleventh time that tapes 17 should be advanced, except that on this occasion tapes 16 will also be advanced by ten increments. This advancing system will continue until all the 9999999 numbers possible have been produced, after which the complete cycle will be repeated.

It will therefore be understood that by using two fixed series of even numbers on one o the protuberances 27 and two fixed series of odd numbers on the other protuberance 27, it is possible to produce objects numbered in serie at a rate of twenty objects per injection with the tapes corresponding to the tens being advanced by ten increments after each injection, the tapes 17 corresponding to the hundreds being advanced by ten increments after each five injections and the other tapes 16, 15, 14 and 13 (thousands etc.) being advanced by ten increments after each ten times that the previous tape has been advanced.

It is clear that the tapes 18 could be shorter (half the length) than the other tapes, in which case they would only have engraved thereon one series of the algorithms 0, 0, 0, 0, 0–9, 9, 9, 9, 9. The manner described and illustrated is preferred since it simplifies the mechanism.

The tape advancing mechanism in reality comprises six almost identical mechanisms, one for each pair of corresponding tapes 13, 13; 14, 14; 15, 15; 16, 16; 17, 17; and 18, 18. for this reason only that mechanism that is associated with tapes 13 is illustrated in more detail in FIGS. 4 and 5. Such mechanism comprises a double acting hydraulic cylinder 28 having a piston 29 which drives a rack 30 to the left when the cylinder is actuated. The end of the stroke of the rack is determined by a regulable stop 31 connected to the hydraulic cylinder control circuit so that, on being struck by the end of the rack 30, fluid pressure is applied to the other side of the piston which then returns to its normal position. The regulable stop 31 also serves to regulate the exact point of the end of the stroke of the rack 30 and consequently also the stopping points of the tapes 13 after each advance, as will be understood from the following description.

The rack 30 cooperates with the teeth of a pinion 32 mounted on a shaft 33 by means of a ratchet device defined by internal ratchet teeth 34 around an inner opening in the pinion and two spring loaded pins 35 at almost diametrically opposite positions on the central region of shaft 33.

The two ends of shaft 33 are mounted in bearings 36 and, symmetrically keyed to the shaft, there are two sprockets 37 the teeth of which are so dimensioned and interspaced as to cooperate with the orifices 19 (see FIG. 2) in tapes 13. In the mechanism being described, the sprockets 37 are keyed substantially to the two ends of shaft 33 but, in the other mechanisms, the sprockets are progressively displaced towards the central region of the shaft so as to be correctly positioned to receive the respective tapes 14, 15, 16, 17 and 18. This is clearly shown in FIG. 6.

One of the sprockets 37 is provided with a series of small holes 39 distributed around a circle and interspaced to correspond to the increments of advance provided by the teeth of the rack 30, such holes receiving the rounded end of a spring loaded positioning pin 40 to fix the angular position of the sprocket and thus the position of the tapes 13 after each advance thereof.

FIG. 6 also shows schematically the hydraulic lines 41 of the cylinders 28 and a control box for commanding the application of pressure to one or the other side of one or more of the pistons 29. This control box 42 includes a circuit programmed to activate the respective cylinders between injections—on each opening of plates 1 and 2—to advance tapes 13–18 in the sequences described above. The circuit is no more than a counter but which advances tapes 18 only five times before advancing the next tapes 17, after which—with respect to the other tapes—the counting is decimal, that is to say, each other tape is advanced after ten advances of the previous tape. The control circuit is not described since it is basically conventional and within the knowledge and skill of anyone versed in the electrical and electronic arts. Alternatively, a mechanical counting system operated by the physical movement of the plates on opening could be used.

During operation, when the mold opens separating plates 1 and 2, the counter causes hydraulic pressure to be applied against the right side of the piston 29 of the mechanism associated with tapes 18, thus shifting the corresponding rack 30 to the left until it reaches the stop 31 marking the end of its stroke. The movement to the left of the rack rotates pinion 32 and, by ratchet action, also shaft 33. This rotates sprocket 37 which, in its turn, advances tapes 18. When the rack reaches stop 31, tapes 18 have already been advanced ten increments and sprocket 37 stops in an angular position where the positioning pin enters and remains in one of the holes 39 to retain the sprocket elastically in this precise position. At the same instant, contact of the end of rack 30 with stop 31 initiates a command to invert the hydraulic pressure which is then applied to the left side of piston 29 so that it returns to its initial position. On returning together with the rack, the pinion 32 also turns anticlockwise but does not rotate shaft 33 with it thanks to the ratchet system.

The advance mechanism associated with the tapes 18 is actuated obviously on each opening of the mould whereas the other mechanisms are actuated only when so determined by control box 42 in the counting sequence.

The mold according to the present invention is susceptible to various modifications within the basic concept of the invention. Thus, the illustrated and described manner of tightening and loosening the tapes in plate 2 between and during injections is only a preferred one. For example, each wedge type bar 12 could be substituted by a plurality of small wedges distributed along one edge of the respective passageway 9. Equally, bars 12 could be placed along the other edges of the passageways, substituting the protuberances 27 and having the fixed numbers engraved thereon. These numbers could be engraved on separate inserts and fixed in recesses in the bars 12 or in the protuberances 27. Similarly, the advancing mechanisms could be modified provided that they produce the advance movements according to the required sequence. The symmetrical system illustrated, however, with each shaft 33 having two sprockets 37 for corresponding tapes of the two groups of tapes, is very much preferred.

I claim:

1. Plastic injection mold with serial numbering of the objects being molded, comprising:
   a) a first plate having two substantially parallel series of ten injection cavities;
   b) a second plate adapted to be brought against the first plate to close said cavities, the second plate being provided with two series of ten fixed algorithms in positions corresponding to the last algorithms of the numbers to be molded in the respective cavities of the first plate, the fixed algorithms of the first series being respectively the even numbers 0, 2, 4, 6, 8, 0, 2, 4, 6 and 8 and the fixed algorithms of the second series being respectively the odd numbers 1, 3, 5, 7, 9, 1, 3, 5, 7 and 9;
   c) two pluralities of endless molding tapes, a first tape of each plurality having spaced therealong an even number of series of ten groups of five identical algorithms 0, 0, 0, 0, 0; 1, 1, 1, 1, 1; ... 9, 9, 9, 9, 9, and each of the other tapes having spaced therealong at least one series of ten groups of ten identical algorithms 0, 0, 0, 0, 0, 0, 0, 0, 0, 0; 1, 1, 1, 1, 1, 1, 1, 1, 1, 1; ... 9, 9, 9, 9, 9, 9, 9, 9, 9, 9, each algorithm of each of the tapes being spaced from the next and from the previous algorithms by a distance equal to the distance between said fixed algorithms, and the number of series of groups of algorithms on said other tapes being half the even number of series on said first tapes;
d) two parallel passages recessed in the face of the second plate for permitting longitudinal advances of the respective pluralities of tapes so that twenty numbers in series are composed together with the twenty fixed numbers;
e) means for individually advancing said tapes along said passages by increments corresponding to ten times or a multiple of ten times the said distance between the fixed numbers; and
f) command means for activating the advancing means in accordance with a predetermined program.

2. Plastic injection mold according to claim 1, in which the width of each of said parallel passages is greater than the sum of the widths of the corresponding plurality of said tapes so as to permit the longitudinal advance of said at least one of said tapes when said first and second plates are separated from each other, the second plate being further provided with means for laterally squeezing the tapes of each of said pluralities of molding tapes together when the plates are brought against each other.

3. Plastic injection mold according to claim 2, in which a side edge of each of said passages is bevelled and wherein the mold further comprises a wedge type bar mounted in said passage, elastically biased outwardly from the passage and having a longitudinal correspondingly bevelled edge for cooperation with the bevelled edge of the passage, said bar having a second longitudinal edge a side surface of which is adapted to bear against a first tape of the corresponding plurality of tapes.

4. Mold in accordance with claim 1, 2, or 3, wherein the said means for advancing the tapes comprise a number of substantially identical mechanisms, said number being equal to the number of tapes in each of said pluralities of tapes, each of said mechanisms comprising a shaft having two sprockets mounted symmetrically with respect to the length thereof, each sprocket having separate teeth spaced from each other by distances equal to the spacings between the algorithms in the said tapes, at least one of said teeth of each of said sprockets cooperating with at least one orifice in one tape of two corresponding tapes of the two pluralities of tapes.

5. Mold in accordance with claim 4, wherein each of said mechanisms further comprises a rack actuated by a double acting hydraulic cylinder and a pinion that cooperates with the rack and drives said shaft unidirectionally through a ratchet mechanism.

6. Mold in accordance with claim 5, wherein each of said tape advancing mechanisms includes a stop to determine the end of the stroke of said rack, contact between an end of the rack and the stop being detected by the command means to invert the application of hydraulic pressure to the hydraulic cylinder to retract the rack back to the beginning of the stroke.

7. Mold in accordance with claim 6, wherein said stop is adjustable.

* * * * *